United States Patent [19]

Hagedorn et al.

[11] Patent Number: 4,551,042

[45] Date of Patent: Nov. 5, 1985

[54] TRANSFER SYSTEM FOR FISH AND SIMILAR ARTICLES

[75] Inventors: Stanley R. Hagedorn, Lynnwood; Stewart W. Roach, Seattle, both of Wash.

[73] Assignee: Marco Seattle, Inc., Seattle, Wash.

[21] Appl. No.: 611,179

[22] Filed: May 17, 1984

[51] Int. Cl.⁴ .............................................. B65G 53/40
[52] U.S. Cl. ..................................... 406/93; 406/153; 417/174
[58] Field of Search ..................... 406/93, 94, 151–153, 406/105; 210/258, 416.2; 43/6.5; 261/77, DIG. 75; 417/174

[56] References Cited

U.S. PATENT DOCUMENTS 3,969,834  7/1976  Geier et al. .................. 406/152
4,372,712  2/1983  Powell et al. ................. 406/153

Primary Examiner—Jeffrey V. Nase
Assistant Examiner—L. E. Williams

[57] ABSTRACT

Pumping efficiency for fish and other articles has been achieved far beyond expectations. By extracting water and adding air at a location in the pumping system higher than the initial air injection point, thereby excluding a certain percentage of the water, efficiency is not only increased but variable control capabilities are achieved.

10 Claims, 3 Drawing Figures

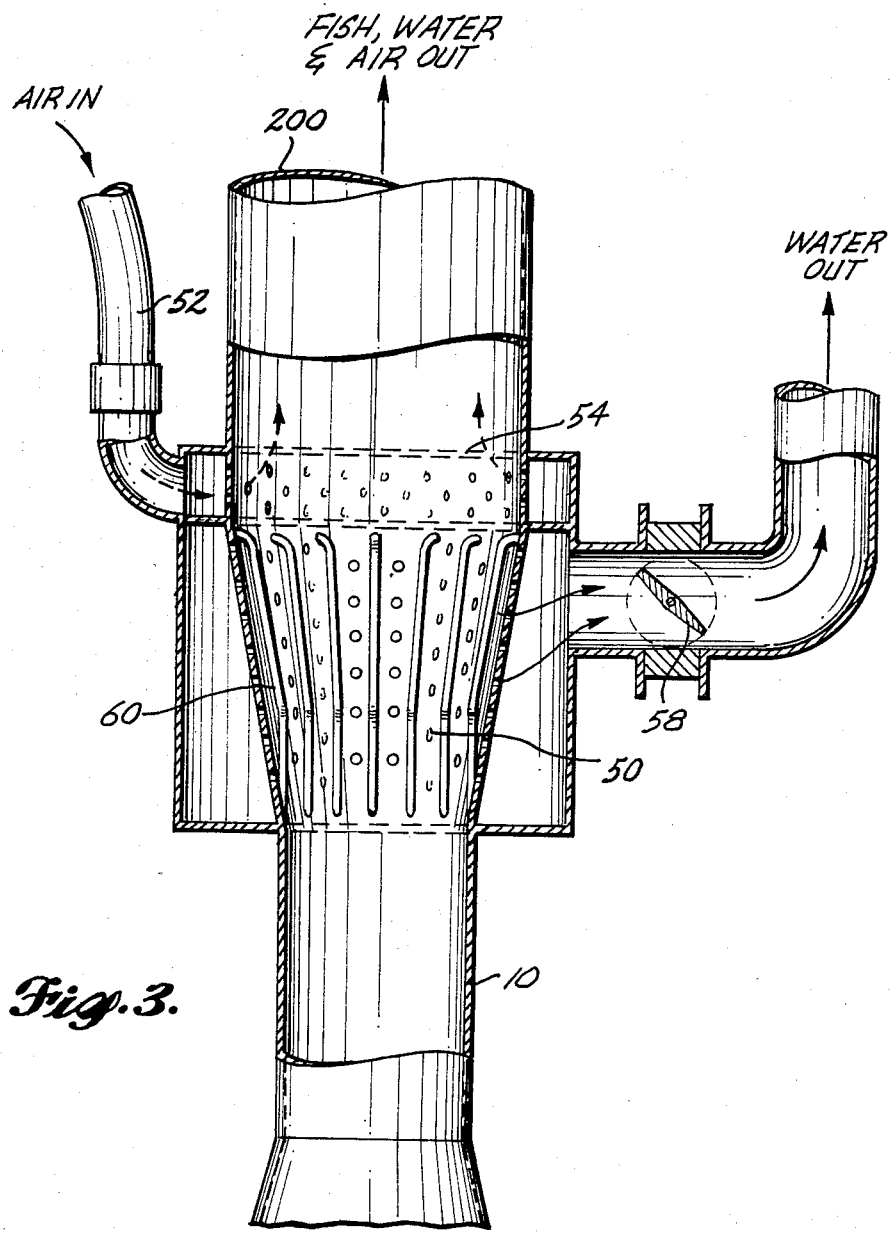

4,551,042

TRANSFER SYSTEM FOR FISH AND SIMILAR ARTICLES

BACKGROUND OF THE INVENTION

This invention relates to apparatus for elevating fish and similar articles without damage to increased elevations in a transfer conduit, at improved efficiency and with reduced input power requirements. Major advantages in transferring fish and the like from a net, fish hold or other storage facility to elevated discharge locations stemmed from the invention of Stewart Roach, Ser. No. 149,139, filed May 12, 1980 (currently on appeal to the Board of Appeals). The present invention is unique in the fulfillment of the further objectives as stated above. To illustrate numerically, undamaged transfer of fish and similar articles for elevated discharge at dockside and other locations can now be achieved at considerably reduced input drive power to the system and to heights of from twice to three times those previously considered feasible without flesh damage.

The invention developed out of the prior concepts mentioned above in which certain unexpected advantages were discovered in the added combination of an air injection pump working in combination with a water injection pump and with a flow diffuser. It was found under the operating relationships described in our earlier pending application that fish and similar articles could be elevated substantially damage free to substantial heights above sea level in the unloading of boat nets, boat fish holds and other containers, much higher than with other continuous flow systems. Even shrimp and other delicate crustacea were handled effectively in this manner. Nevertheless, limitations to those pumping heights existed which curtailed usefulness for a number of important applications.

The invention here presented not only overcomes most, if not all, of those limitations, but it also adds continuously progressive drive power control over pumping height and in pumping efficiency, if that be necessary, yet in each instance without damage to the product.

SUMMARY OF THE INVENTION

In accordance with this invention, there is disclosed complementarily formed injection pumps for the mixture of air and water for picking up fish and similar articles and elevating them through the previously attainable height ranges to which are added separate flow diffuser means, water ejection pump means and air injection pump means at a location preceding whatever discharge means are employed to further process or discharge the articles. The alternative, in operating terms, may be to operate the water ejection pump means free of restraint, which for a high percentage of applications may be the normal case. By operating the water ejection pump at optimum volume level in relation to air injection volume level, with the flow diffuser functioning, it is found that increased pumping heights are attainable by as much as two or three times those previously attained. The process operates at considerably lower drive power than one expects for the great increase in pumping height achieved.

These and other features, objects and advantages of the invention will be seen from the following description of the presently preferred embodiments thereof.

BRIEF DESCRIPTION OF THE DRAWINGS

FIG. 3 is a sectional side view of an alternative form of diffuser that may be employed in the system.

DETAILED DESCRIPTION OF THE INVENTION

Figure 1:
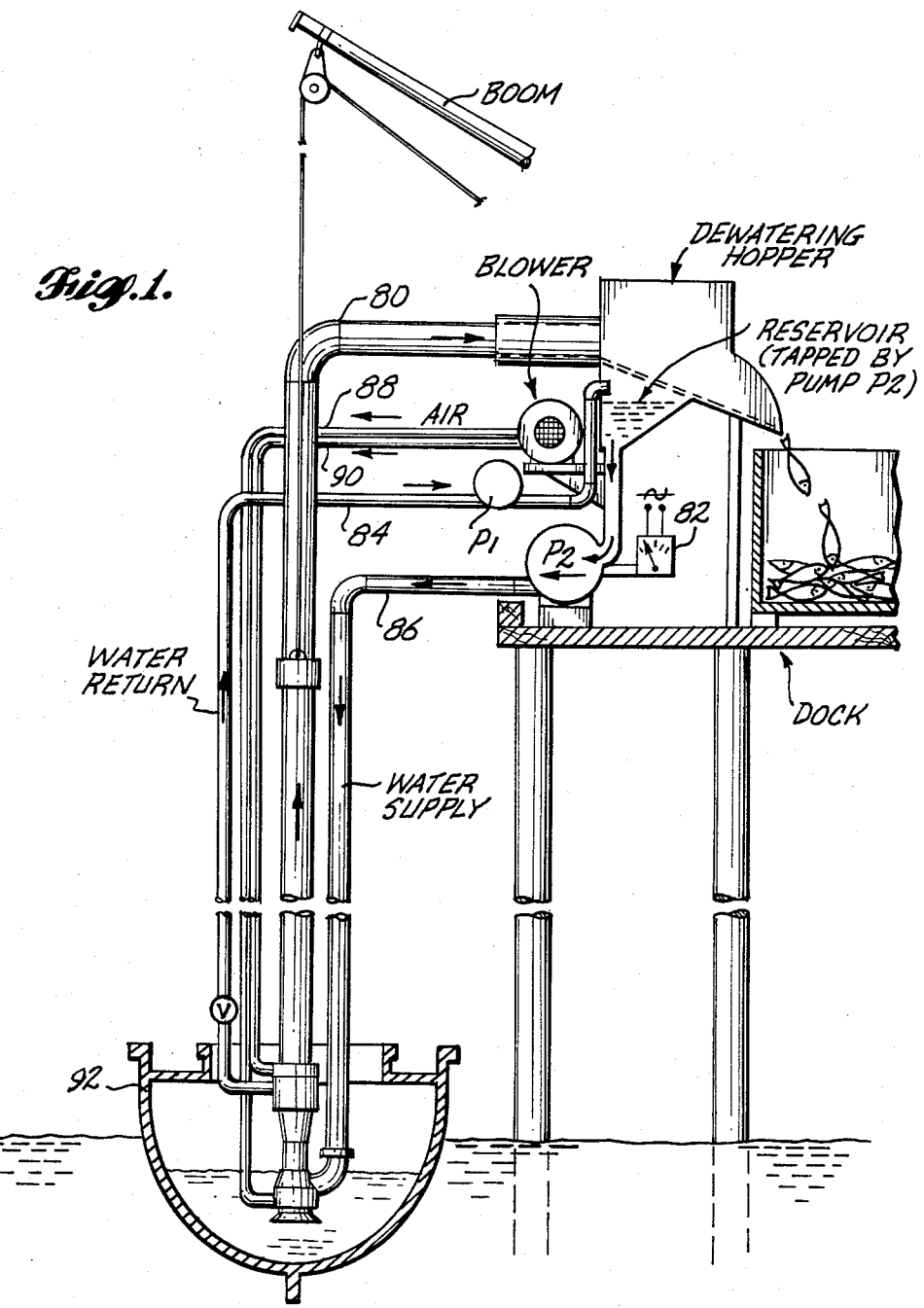
FIG. 1 is a sectional side view illustrating the improved system in a typical application.
Figure 2:
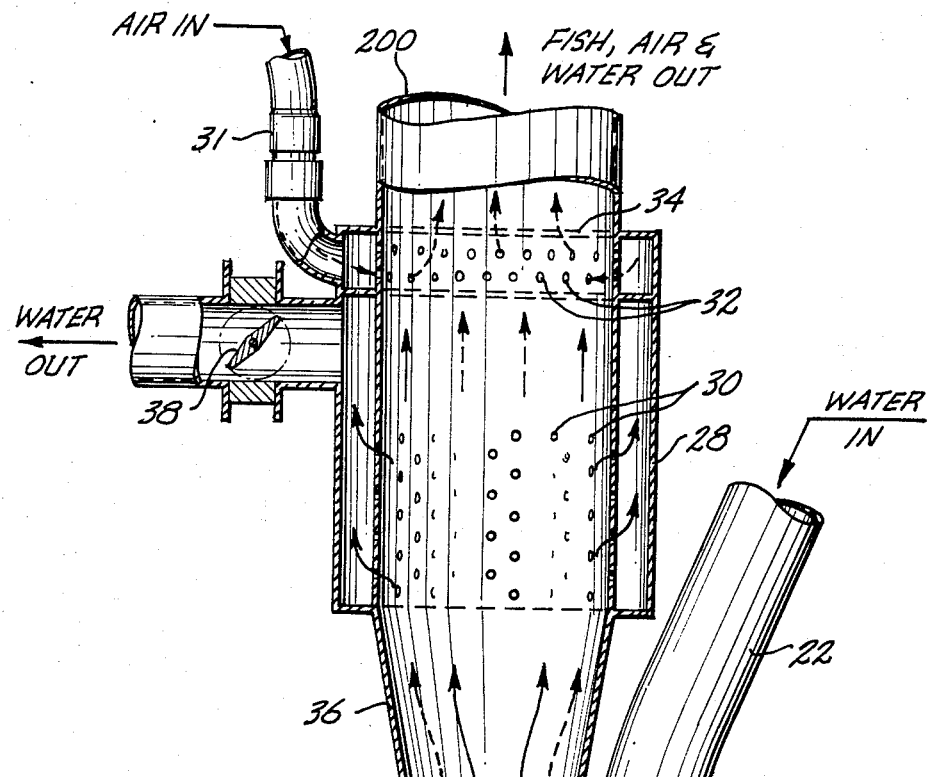
FIG. 2 is an enlarged section side view of a diffuser constructed in accordance with this invention.
Figure 2:
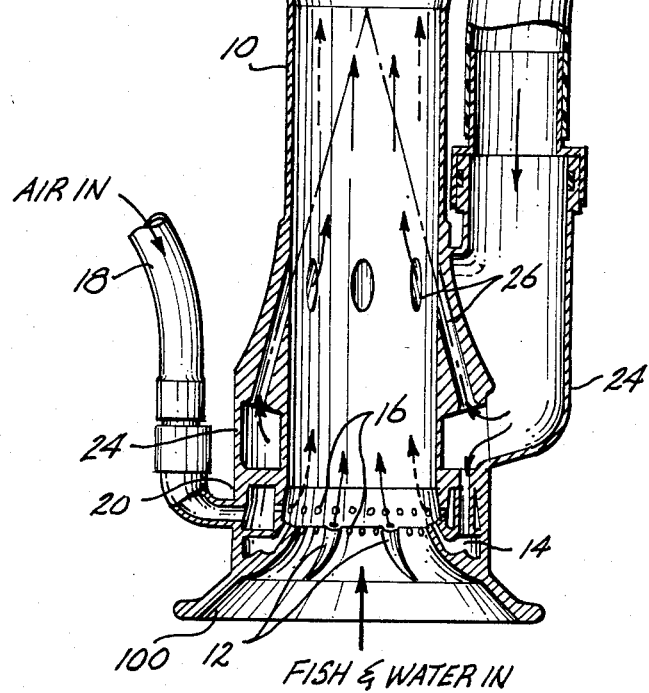

Referring to the drawings, the open bell-shaped bottom of conduit 10, flanged for strength and area coverage, preferably incorporates an annular series of small upwardly directed water lift jets 12, conveniently six in number, fed out of a bypass ring 14 leading from the main water jet assembly to be described. These auxiliary water jets 12 serve to provide a low placed interface mix combining water with the adjacent pattern of air, to support the water column below the main jets, so that the pump remains primed below the main intake, particularly when starting with a relatively dry fish hold. Other uses, of course, can involve deep submergence of the inlet bell in a seine net.

The main air jet supply enters the feed bell through two ring series of air inlet apertures 16 being supplied by an air hose 18, the latter being coupled to an air collector and distribution ring 20. The ring series of air injection apertures are placed closely adjacent to the water lift jets 12, where they perform their function described in the aforementioned pending application.

The main injection drive water for the pump apparatus is supplied through a pressure hose 22 leading through a suitable coupling to a water injection collection and distribution collar 24 also preferably surrounding the belled lower portion of conduit 10 as shown. Conveniently, six or eight upwardly directed water flow jets 26, angled upwardly by a suitable angle such as 15° to the vertical (when the conduit is oriented vertically), provide the main drive thrust in the system. It is this combination of air-entrained water by which fish and similar articles are carried upwardly in conduit 10 essentially free of flesh damage. To this point in the present disclosure, the apparatus is essentially the same as the disclosure in the prior pending application.

In accordance with the present discovery, bleeding of water out through apertures 30 in ring collar 28 followed by further injection of air through apertures 32 through supply hose 31 leading to ring collar 34 accomplish the objectives, particularly if collar 28 is immediately preceded by a diffuser 36. As previously indicated, this particular combination of elements not only fulfills the highly important need for achieving materially greater pumping heights, still without flesh damage and with the incidental, yet not insignificant, advantage of doing so with the ready capability of varying pumping heights on a smoothly variable basis, while minimizing overall drive power requirements.

As to the role of diffuser 36, attempts to design the improved system without a diffuser of appreciable flare angle increasing the conduit diameter have thus far met with less-than-satisfactory results. These adverse results are due to the inherent increase in upward water flow velocity above the main injection system, which causes friction losses. By reducing the velocity, the friction head losses are maintained at acceptable levels needed for system efficiency. The conical diffuser flare angle is preferably of the order of 10° to 20°, included angle, a range of angles which keeps the water-borne articles moving smoothly upward by virtue of their entering momentum.

As the articles start to pass the diffuser, an additional effect is experienced beyond increased pumping height per se. It is an effect attributable to the presence of the water bleed apertures, and more specifically to the pressure effect immediately below the air bleed collar. With this arrangement, withdrawal of water occurring around the inside periphery of the water collection collar predominates. In doing so, the residual and added air in the rising column of air-water mixture tends to expand and bubble outwardly more rapidly than at the immediately underlying rate in the diffuser. It is found that this furnishes added protection for the articles being transferred, that is, added protection against the potential for abrasive action against the multiple apertured section of air collar wall apertures. Moreover to the extent there is a variation in the average water density gradient over the cross section of the water-jacketed section of the conduit, the most centrally located portion carries the principal momentum and it does so in preparation for the radially inward push of air from the bleed ports in the air collar. The ensuing rising column of water-borne articles then moves upwardly at a substantially uniform rate across the conduit's full cross section.

For control purposes, a water flow rate control regulatory valve 38 is provided in the collector outlet. In the system indicated (there are other systems such as a centrifugal pump system, $P_1$, with capability of achieving similar regulatory action through use of reservoir pump $P_2$), changing the setting of this valve permits dramatic change in the progressive adjustability in the output or pumping rate. In addition, the rate of air injection may also be varied proportionately so as to vary pumping height.

Performancewise, and in summary, the novel apparatus is capable of elevating fish and other articles to heights in excess of 48 feet above water level or boathold level, as the case may be. The volume of water in the main conduit channel above the liquid collection ring can be readily varied. Jet water pressure requirements are also significantly reduced over the entire pumping range, thereby increasing the overall mechanical efficiency of the system.

In the liquid discharge section of system 28, part of the flowing water is tapped off and either returned to the fish hold of a fishing vessel, to the sea itself or to a reservoir for recirculation (where fresh water is used in the pumping system and must be replaced for the system to keep it functioning). In effect, then, removal of (tapping off) part of the main body of water rising in the conduit has two important effects, one being to reduce flow velocity in the conduit, and thereby friction losses, and the other being to reduce the airflow volume required into the upper collector ring 34 in order to attain desired air-water ratio. Thus, in the upper air ring 34, large quantities of air are injected to lighten the average density of the liquid column in the conduit for increasing lift. As a special design feature, although not one essentially required, the pressure driving the air-lift stage is provided by water jet nozzles, thereby replacing the submerged pipe section commonly required in conventional air lifts. Thus, there are various ways by which to combine water pump systems with the unique combination here involved, without exceeding the limits or departing from the water pump requirements of that system.

The novel apparatus can be size-scaled with controlled accuracy so that the pump can be built to any desired diameter. Inlet minimum water flow velocity is easily maintained and greatly exceeded, it usually requiring about 3.5 feet per second to lift fish, whereas with the improved system, inlet velocities of up to 15 feet per second are attainable. Air supply to the lower ring can be readily varied according to application. When pumping with a submerged inlet, as from a seine net, large air volumes at up to 15 psig can be used. When pumping from dry fish holds, these airflow rates can be cut back to the point where little or no air is used, since air is already entering the bell inlet of the pump with the fish. The main purpose of the air in the bell section entrance of the pump, in any event, is to cushion the fish or articles when they pass the main jet nozzles.

Versatility in design adaptability of the main jet nozzles in the bell of the pump (typically placed at a 15° angle, more or less, to the conduit axis) allows for considerable variation both in the number and in the diameter of those orifices to suit different applications. For example, if the total cross-sectional area of the nozzles combined is 10% of the cross-sectional area of the throat (column 10 area), and is assumed to be a standard area ratio, it is nonetheless feasible for applications involving transfer of fish, particularly delicate live fish, to increase this area ratio to as high as 40% in order to increase system efficiency and attendantly lower water jet pressure and velocity.

Water diffuser 36 employs a conical flare angle that may be varied. The angle selected, on the order of 10° to 20°, included angle, is chosen to minimize friction head losses in the system while maintaining momentum of upward flow into the water collector and distributor ring 28.

In designing the apertures 30 of the liquid discharge ring 28, different design configurations may be used, such as perforations (as shown), slots or other means allowing water, but not fish, to be withdrawn from the main flow. In order to assure that outflow rates through whatever throughwork is employed will not exceed those that might produce flesh damage, water flow rates are preferably held below 2 feet per second and the pressure drop to under 10 psig, depending, of course, on static pressure in the main conduit. As previously indicated, outflow rates through the water collar outlets are regulated by valve 38, or in the case of a centrifugal pump, by suction to those pumps. Velocities in the discharge column 200 are dramatically affected by the water ejection rate, first by decreasing the volume of water passing through the discharge, and secondly by decreasing the amount of air required going into injection ring 34 (or 54) in order to achieve the proper air-water ratio.

A further unique feature of the improved apparatus lies in providing a combined water injection (jet) pump and air-lift injection nozzle system at the lower end of the bell, with the jet pump's power made adequate to drive the air lift. Since the air supply to the lower end must be restricted in order to maintain suction lift for the fish and water induced to enter at the bell's entrance, it becomes highly practical to utilize essentially the full potential of the air-lift drive for the upper ring. This is true inasmuch as the water volume and velocity passing the upper air ring is regulated (limited) by the diffuser and regulated by any valving action applied to the liquid discharge ring. Flow ratios with this system can be adjusted to utilize air-to-water volume ratios of up to the vicinity of 3.25:1, highly effective for air lifts applied to the articles involved. The addition of air in such high proportions greatly reduced the weight of the flowing mixture so that the effective pumping height altitude is much higher than with the aforedescribed system.

To illustrate further the functional capabilities of the new system, representative measurements were made. For example, with a 33-foot pumping height operating at jet water pressure of 60 psig and a static head in the system of 10 psig, closure of the liquid discharge valve was attended by induced fish and water inlet flow velocity (through port 100) at a rate of approximately 4.9 feet per second. However, upon opening of valve 38, the static head dropped to 9 psig and the fish and water inlet flow velocity rose to 13.6 feet per second. With static head held at 8.5 psig, further representative test lift heights and related fish and water inlet flow velocities at the following specified jet water pressures were achieved as follows:

| Lift | Jet Water Pressure | Static Head | Liquid Discharge | Inlet Flow of fish and water into pump (Velocity) |
| --- | --- | --- | --- | --- |
| 33 ft | 48 psig | 8.5 psig | Closed | 1.6 ft/sec |
| 33 ft | 48 psig | 8.5 psig | Open | 7.4 ft/sec |
| 33 ft | 40 psig | 8.5 psig | Open | 5.6 ft/sec |
| 48 ft | 60 psig | 8.5 psig | Open | 7.5 ft/sec |
| 48 ft | 52 psig | 8.5 psig | Open | 4.7 ft/sec |

In the modified diffuser shown in FIG. 3, diffusion flow and water collection and distribution are combined in a conically tapered discharge section 50. Air is introduced through hose 52 to collection ring 54 having a multiply apertured interior wall. Progressive expansion of flow cross section occurring in chamber 50 is attended by water removal at controlled rates past regulator valve 58. Convergently related grid bars 60 provide an openwork to exclude fish and other similar articles entering into the perforations in the cone 50.

As shown in FIG. 1, air with water, with the product mixed, is driven from the pipe at 80 to dockside. If desired, pump control 82 can be inserted. It may or may not be necessary. The water in conduits 84 and 86 flow in opposition. Air in hoses 88 and 90 flow in parallel. Fish in the hold of boat 92 are worked progressively to the bottom of the boat (in the usual case).

These and other aspects of the invention will be recognized from an understanding of the essentials and as being covered in the claims which follow.

The embodiments of the invention in which an exclusive property or priviledge is claimed are defined as follows:

1. Apparatus to elevate fish and similar articles undamaged in a transfer conduit, comprising conduit means with a lower end open to receive the articles, air injection pump means overlying said lower end and water injection pump means overlying the air injection pump means and the lower end, the two pump means configured and cooperating together to create relative flow pressures and velocities which transfer the articles in a partially airborne state upwardly in the conduit means substantially free of damage to elevations materially above water level, said conduit means further having:

flow diffuser means overlying said water injection pump means operable to decrease water flow velocity;

water vent ejection means overlying said water injection pump means supplied through openwork in the conduit means wall for withdrawing upwardly flowing water while preventing passage of articles and permitting continued advancement of water upwardly with residual air buoying the articles upwardly in the conduit means;

second air injection pump means adjacent and overlying said water vent ejection means operable at airflow rates buoying the water-borne articles further upwardly in said conduit means; and means to discharge such articles from said conduit means above said second air injection pump means.

2. Apparatus as defined in claim 1, including means operable in conjunction with water ejection pump means to vary the water ejection rate through said water injection pump means.

3. Apparatus as defined in claim 1, wherein the venting of water by the water vent means occurs at a flow rate wherein the injection of air by the second air injection pump means creates a ratio of approximately 3:1 of air to water in the continued upward flow of water-borne articles in the conduit means.

4. Apparatus as defined in any of claims 1-3, wherein the flow diffuser means is formed by expanding the conduit cross-sectionally by approximately 25% to 35%.

5. Apparatus defined in any of claims 1-3, wherein the second air injection pump means comprises a multiple-apertured length section of conduit wall of substantially the same conduit diameter as the wall with the water vent openwork therein.

6. Apparatus defined in any of claims 1-3, wherein the diffuser means comprises an upwardly divergent wall section of conduit having openwork permitting said divergence to serve the diffuser function while providing the water vent ejection pump function.

7. The method of pumping fish and similar articles upwardly in a conduit using air and water, comprising generating a rising column of water mixed with air in an upright conduit so as to carry the articles upwardly in the conduit, creating divergence in the rising column of water attended by withdrawing part of the water from the rising column so as to materially reduce the upward velocity of water and thereby the friction losses of flow therein, and a thereafter buoying the articles further upwardly without flesh damage by injecting a rising stream of air into the rising column.

8. The method defined in claim 7, wherein the water is withdrawn at a plurality of locations around the periphery of the rising column.

9. The method defined in claims 7 or 8, wherein the water is withdrawn at a plurality of locations around the periphery of the rising column and the air is injected at a plurality of locations around the periphery of the rising column.

10. The method defined in any of claims 7-9, wherein the divergence of flow is created by expansion of the rising column's cross section over substantially the same height section of the rising column as that from which the water is withdrawn.

* * * * *